(No Model.)
C. T. WECKER.
HUB ATTACHING DEVICE.
No. 321,068. Patented June 30, 1885.
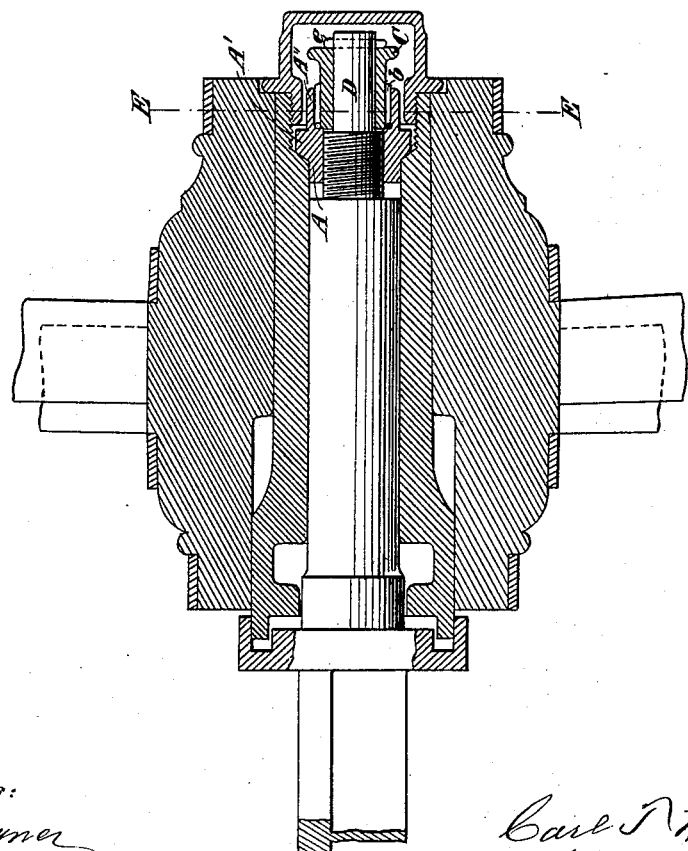

ively to the other. As the sleeve C is precluded from turning, of

UNITED STATES PATENT OFFICE.

CARL T. WECKER, OF OFFENBACH-ON-THE-MAIN, GERMANY.

HUB-ATTACHING DEVICE.

SPECIFICATION forming part of Letters Patent No. 321,068, dated June 30, 1885.

Application filed June 29, 1883. (No model.) Patented in Germany September 26, 1882, No. 22,282, and in France October 10, 1882, No. 151,488.

*To all whom it may concern:*

Be it known that I, CARL THEODOR WECKER, of Offenbach-on-the-Main, Germany, have invented a new and useful Improvement in Wheel-Axle Boxes, of which the following is a specification.

It is well known that the efficiency of means employed to secure a wheel-axle box on the axle-arm depends on the box being simply and solidly secured on the axle-arm in such a manner that it shall have no end-play or play in the direction of the length of the axle.

The object of my invention is to enable the nut which is applied to the end of the axle to be turned a small fraction of a turn to tighten it, and then securely locked against turning, and at the same time to obtain a long length of thread on the axle and nut without unduly increasing the length of the axle-box.

The invention consists in a novel combination of parts hereinafter particularly described, and pointed out in the claim, whereby the desired result will be attained.

In the accompanying drawings, Figure 1 is a longitudinal section of the end portion of an axle and an axle-box embodying my invention and applied to a wheel-hub, and Fig. 2 is a transverse section on the line E E, Fig. 1.

Similar letters of reference designate corresponding parts in both figures.

A designates a nut screwed upon the threaded end of the axle, and provided with a flange, A', which fits against a beveled seat on the axle-box, and holds the same in place on the axle. This nut is made with a polygonal head or projection, A'', to which a wrench may be applied for turning the nut. The nut A has a portion projecting inward of the flange A', and having a cylindric exterior, which enters into and fits within the end portion of the axle-box. By this construction I am enabled to get a long thread, whereby the nut is secured on the axle without unduly increasing the length of the axle-box and axle. The polygonal head A'' is considerably larger internally than the projection D of the axle, as best seen in Fig. 1.

C designates the sleeve which is applied to the projection D, and held thereon between a shoulder formed by the end of the threaded portion of the axle and a key or cotter, e, passed through the outer end of the axle. As clearly shown in Fig. 2, the projection D is cylindric externally except for a flattened portion at one side, and the sleeve is of corresponding form internally, it being cylindric except for a flattened portion; consequently it will be seen that when upon the projection D the sleeve C is absolutely precluded against turning.

As shown in Fig. 2, the sleeve C is provided externally and the head A'' is provided internally with numerous small teeth or projections b, which interlock, and thus prevent the turning of one part relatively to the other. As the sleeve C is precluded from turning, of course the nut A cannot be turned or turn accidentally, and hence a tight joint will be maintained between the flange A' and the seat in the axle-box on which it bears.

In order to take up wear, it is only necessary to take out the key or cotter e, slide the sleeve C outward on the projection, and tighten the nut A. As here shown, there are twenty teeth in each the sleeve C and head or projection A'', and it will therefore be understood that the nut may be tightened even so little as one-twentieth of a turn and again locked.

I am aware of United States Letters Patent No. 190,885, granted May 15, 1877, to J. A. McCray, and I do not desire to include in my invention anything therein shown or described. In that patent the nut has in its face a recess, which receives a polygonal washer locked against turning on the end of the bolt, and the length of thread in the nut is greatly reduced by the formation of the recess in its face. My nut A differs from that just referred to in that it has a flange or shoulder, A', and a portion extending inward of said flange or shoulder and entering the end of the axle-box. By my invention, therefore, I not only provide for securely locking the nut after being adjusted a very small fraction of a turn, but I also obtain a very long thread, by which the nut engages with the axle without unduly increasing the length of the axle-arm and axle-box.

What I claim as my invention, and desire to secure by Letters Patent, is—

The combination, with the axle-box and the axle having the cylindric end portion D, flattened on one side, of the nut A, having a flange, A', bearing against a seat on the axle-box, and a cylindric portion extending inward from said flange and entering the axle-box, and also having beyond or outside said flange a hollow polygonal head, A'', the sleeve C, having its interior cylindric, with a flattened portion corresponding to the axle portion D, and entering the hollow head A'', and the key or cotter e, the said sleeve C and head A'' being provided with interlocking teeth b, which extend longitudinally upon their adjacent cylindric surfaces, substantially as herein described.

In testimony whereof I have signed my name to this specification in the presence of two subscribing witnesses.

CARL T. WECKER.

Witnesses:
   FRANZ HASSLACHER,
   JOSEPH PATRICK.